United States Patent [19]

Nagasubramanian et al.

[11] Patent Number: 5,599,355
[45] Date of Patent: Feb. 4, 1997

[54] METHOD FOR FORMING THIN COMPOSITE SOLID ELECTROLYTE FILM FOR LITHIUM BATTERIES

[76] Inventors: Ganesan Nagasubramanian, 12028 Caribou, NE., Albuquerque, N.M. 87111; Alan I. Attia, 41 Perry Dr., Needham, Mass. 02192

[21] Appl. No.: 186,183

[22] Filed: Jan. 19, 1994

Related U.S. Application Data

[63] Continuation-in-part of Ser. No. 112,483, Aug. 20, 1993, Pat. No. 5,360,686.

[51] Int. Cl.$^6$ .................................................. H01M 4/04
[52] U.S. Cl. ...................... 29/623.5; 429/188; 429/191; 429/192; 429/193; 252/62.2; 264/211
[58] Field of Search ........................... 429/188, 189, 429/191, 192, 193; 252/62.2; 264/211; 29/623.5

[56] References Cited

U.S. PATENT DOCUMENTS

| | | | |
|---|---|---|---|
| 4,620,944 | 11/1986 | Armand et al. | 252/518 |
| 4,990,413 | 2/1991 | Lee et al. | 429/191 |
| 4,999,263 | 3/1991 | Kabata et al. | 429/131 |
| 5,057,360 | 10/1991 | Osaka et al. | 428/220 |
| 5,112,512 | 5/1992 | Nakamura | 252/62.2 |
| 5,154,991 | 10/1992 | Plichta et al. | 429/193 |
| 5,204,196 | 4/1993 | Yokomichi et al. | 429/192 |
| 5,205,965 | 4/1993 | Uetani et al. | 252/500 |
| 5,354,611 | 10/1994 | Arthur et al. | 428/325 |
| 5,358,680 | 10/1994 | Boissonnat et al. | 264/177.2 |
| 5,360,686 | 11/1994 | Peled et al. | 429/191 |

Primary Examiner—M. Nuzzolillo

[57] ABSTRACT

A composite solid electrolyte film is formed by dissolving a lithium salt such as lithium iodide in a mixture of a first solvent which is a cosolvent for the lithium salt and a binder polymer such as polyethylene oxide and a second solvent which is a solvent for the binder polymer and has poor solubility for the lithium salt. Reinforcing filler such as alumina particles are then added to form a suspension followed by the slow addition of binder polymer. The binder polymer does not agglomerate the alumina particles. The suspension is cast into a uniform film.

13 Claims, 4 Drawing Sheets

METHOD FOR FORMING THIN COMPOSITE SOLID ELECTROLYTE FILM FOR LITHIUM BATTERIES

ORIGIN OF THE INVENTION

The invention described herein was made in the performance of work under a NASA contract, and is subject to the provisions of Public Law 96-517 (35 USC 202) in which the Contractor has elected not to retain title.

CROSS REFERENCE TO RELATED APPLICATION

This application is a continuation-in-part of Ser. No. 112,483 filed Aug. 20, 1993, now issued as U.S. Pat. No. 5,360,686.

TECHNICAL FIELD

The present invention relates to elevated temperature, secondary lithium batteries and more particularly, this invention relates to a method of forming a composite, solid electrolyte film for such batteries.

BACKGROUND OF THE INVENTION

Advanced, high energy density batteries are required for use in space, military, communication and automotive applications. Certain jurisdictions, such as California, have mandated that an increasing percentage of automobiles must be powered by electricity within the next few years. The lead-acid battery, though reliable and capable of many recharge cycles, is too heavy and has too low an energy to weight ratio. State of the art Ag—Zn and Ni—Cd batteries have poor charge retention properties and are also too heavy and bulky for use on space missions and in some cases do not meet the life and environmental requirements for the missions.

Ambient temperature, secondary lithium batteries have several intrinsic and potential advantages including higher energy density, longer active shelf life, and lower self discharge over conventional Ni—Cd, Pb—acid and Ag—Zn batteries. Successful development of these batteries will yield large pay-offs such as a 2–3 2 fold increase in energy storage capability and a longer active shelf life of 2 to 4 years over Ni—Cd. These cells are most suitable for small spacecraft application requiring less than 1 kW power. Secondary lithium batteries are presently being considered for a number of advanced planetary applications such as: planetary rovers (Mars Rover, Lunar Rover), planetary spacecraft/probes (MESUR, AIM, ACME Mercury Orbiter) and penetrators. These batteries may also be attractive for astronaut equipment, and Geo-SYN spacecraft.

Secondary lithium cells under development employ lithium metal or lithium ions in carbon as the anode, a chalcogenide salt such as $TiS_2$, $MoS_2$, $MoS_3$, $NbSe_3$, $V_2O_5$, $Li_xMn_2O_4$, $Li_xCoO_2$, $LiV_3O_8$ and $Li_xNiO_2$ as cathodes and liquid or solid electrolytes. During discharge of the cell, lithium metal is oxidized into lithium ions at the anode and lithium ions undergo an intercalation reaction at the cathode. During charge, reverse processes occur at each electrode.

Solid polymer electrolyte/lithium batteries using polyethylene oxide (PEO) and other organic polymers complexed with lithium salts as the electrolyte are under development. In addition, gel (polymer) electrolytes have received attention because of improved conductivity over the solid polymer electrolyte materials. These electrolytes have low transference number (0.3–0.5) for lithium cations leading to high concentration polarization and high interface resistance. Salt anions ($BF_4^-$, $AsF_6^-$, $ClO_4^-$, $CF_3SO_3^-$) contained in the polymer are not compatible with lithium and cause the lithium to degrade. The solid polymer electrolytes (PE) have low mechanical strength especially above 100° C. The disadvantages of prior art PE's deter development of high power, high energy polymer lithium batteries for the following reasons. In the PE's the Li cation, which is complexed (bound) to the polymer has low mobility, while the uncomplexed anion moves faster. The activity of the salt anions with lithium results in a thick lithium passivating layer which has high resistance. Also, above 100° C. the prior art PE's become soft and start to flow.

These problems were addressed by changing the mechanism for conduction of lithium ions, eliminating the non-compatible ions and using compatible ions such as halide and adding an inorganic filler as a reinforcing agent.

Addition of $Al_2O_3$ (2) (3) has improved the mechanical strength of polymer electrolytes. However, the lithium transference number was low because the salt was not compatible with lithium ions, the salt concentration was too low and the $Al_2O_3$ particles were too large. Solid lithium iodide (LiI) has good ionic conductivity and low electronic conductivity. Its lithium transference number is close to unity. Conduction is accomplished through a lithium vacancy mechanism (1). It was found that by mixing LiI and $Al_2O_3$ powders and pressing them into a pellet an order of magnitude is gained in conductivity over pure LiI. This is due to the presence of $Al^{3+}$ cations at the LiI interface which results in an increase in the $Li^+$ vacancy concentration. The $Li^+$ conduction is carried out in the LiI mainly at the $LiI/Al_2O_3$ interface. However, a $LiI-Al_2O_3$ pressed pellet is very brittle and has poor mechanical and shock properties. In practice thick pellets are required to avoid these problems. This principle was the basis for the solid state batteries used in low rate medical applications.

LIST OF CITED REFERENCES

1. Comprehensive Treatise of Electrochemistry, Vol. 3 (1981) Bockris et al. Editors
2. J. E. Weston and B. C. H. Steele, Solid State Ionics 7, 75–79 (1982)
3. F. Croce, F. Bonino, S. Panero, and B. Scrosati, Philosphical Magazine 59 161–168 (1989)

STATEMENT OF THE INVENTION

An improved composite solid electrolyte (CSE) containing LiI and $Al_2O_3$ is disclosed in copending application entitled THIN COMPOSITE SOLID ELECTROLYTE FILM FOR LITHIUM BATTERIES Filed Aug. 20, 1993, as Ser. No. 08/112,483, now issued as U.S. Pat. No. 5,360,686, the disclosure of which is expressly incorporated herein by reference. The improved CSE has mechanical properties superior to that of PEO/LiI and exhibits a $Li^+$ transport number close to one which has never before been reported as achieved in a CSE. This completely eliminates concentration and polarization effects and enhances high rate and power capability. The salt anion ($I^-$) is totally compatible with lithium resulting in a stable system. Because of total compatibility and because of an improved lithium transport mechanism, the interfacial Li/CSE resistance is lower by as much as a factor of 10 when Compared with the prior art polymer electrolytes (PE) described above. The ionic conductivity of the CSE at 20°–120° C. is similar to or better than the prior art PE's. The novel CSE will allow development of lithium/TiS$_2$ (or other cathode) batteries with power densities above 100 Wh/Kg (pulse power capability of 1 Kw/Kg) and specific energy of 100 Wh/Kg (based on full battery).

The conduction mechanism for the improved CSE is completely different from that occurring in polymer electrolytes. The Li$^+$ conduction is primarily carried out in an inorganic solid matrix rather than in a salt loaded organic polymer or gel matrix. The improved CSE contains only anions such as halide compatible with Li$^+$. The Al$_2$O$_3$ inorganic filler strengthens the CSE film and eliminates flow of the film at high temperature.

In the improved CSE, compatible lithium halide is coated as a thin film onto the surface of the reinforcing particles. The particles are then bonded together with a polymer which can be a polyelectrolyte such as PEO. The LiI retains the vacancy conduction mechanism for Li$^+$ which is responsible for the transference number near unity for lithium. The binder polymer retains its flexibility. The polymer can function solely as a binder with all conduction occurring in the solid LiI coated particles or if it is a polyelectrolyte, it can serve as a solid electrolyte providing ionic conductivity between the solid particles dispersed in the polymer and bound together by the polymer.

However, when the CSE film was cast from a mixture of polymer such as polyethylene oxide, alumina and lithium iodide from a polar solvent such as acetonitrile, the alumina tended to agglomerate into small balls covered with the polymer. It appears that PEO acts as a scavenger. The agglomerated film was not uniform in composition or thickness. Only small areas of the order of a few millimeters were uniform in composition.

STATEMENT OF THE INVENTION

A method of forming large area, uniform, composite, solid electrolyte films is provided by the invention. The film is uniform over areas at least as large as 5 centimeters permitting formation of films large enough to be useful as a solid electrolyte in a lithium battery.

In the method of the invention, a second solvent which is a solvent for the binder polymer and which has poor solubility for the lithium salt at room temperature is added to the first solvent. The first solvent is a cosolvent for the binder polymer and the lithium salt. The binder polymer is believed to partition between the two solvents preventing the polymer from agglomerating the alumina filler particles as the film sets during casting.

The first solvent is preferably an aprotic organic solvent such as acetonitrile or propylene carbonate. The second solvent can be a lower alkanol containing 1 to 10 carbon atoms, preferably a branched chain alkanol containing 3–6 carbon atoms such as isopropyl alcohol. The two solvents are utilized in about equal amounts by volume usually from 40% to 60% by volume of isopropyl alcohol (IPA), remainder being acetonitrile (MeCN).

The two solvents can be added stepwise to the solution. The lithium salt (LiI) is first added to the first solvent (MeCN). The solution is decanted. The filler (alumina) is added with stirring from 15 to 60 minutes to form a suspension. A first portion of the second solvent (IPA) is added and stirred well. The second portion of the first and second solvents are then added. The binder polymer (PEO) is then added slowly with vigorous stirring. A uniform suspension results. On casting of the suspension into films having a thickness from 100 µm to 200 µm, uniform CSE films were produced.

These and many other features and attendant advantages of the invention will become apparent as the invention becomes better understood by reference to the following detailed description when considered in conjunction with the accompanying drawings.

DISCUSSION OF THE PRIOR ART

U.S. Pat. No. 5,204,196 discloses a solid state conductive polymer composition formed a host copolymer including polyethylene oxide. The electrolyte can include lithium salt.

U.S. Pat. No. 5,154,991 discloses a flexible, electrolyte separator formed by mixing alumina, teflon and an isopropanol solution in water, roll pressing and sintering.

U.S. Pat. No. 5,057,360 discloses a ceramic precursor including alumina and a polymer cast from a slurry in which the solvent can be isopropanol.

U.S. Pat. No. 5,112,512 discloses a solid polymer electrolyte formed from a polyoxyalkalene copolymer and an organopolysiloxane, and which can include lithium iodide.

U.S. Pat. No. 4,990,413 discloses a composite solid electrolyte.

DETAILED DESCRIPTION OF THE INVENTION

Figure 1A:
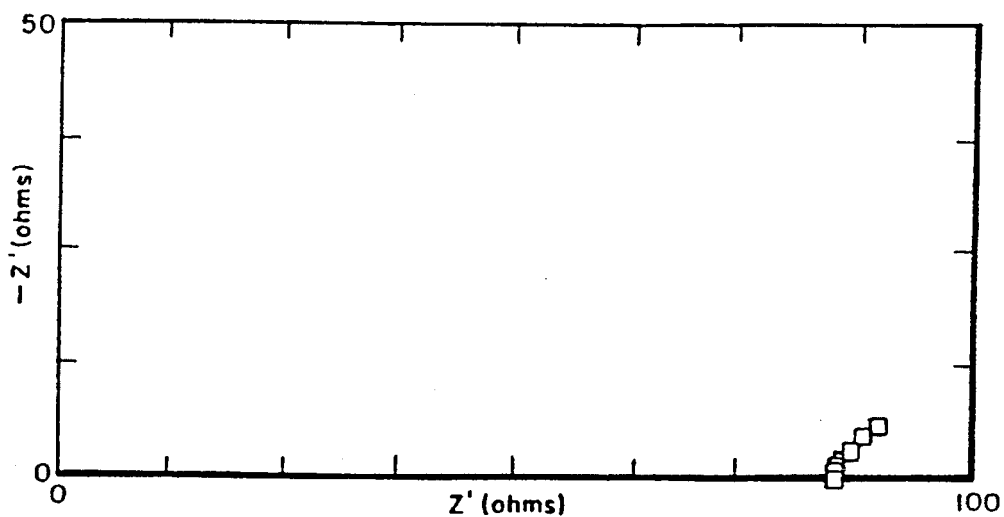
FIG. 1A is a NyQuist plot of a composite solid electrolyte of the invention containing 0.05 micron particles.

As shown in FIG. 1, the composite solid electrolyte (CSE) film 10 of the invention is utilized in a thin, solid state battery. A battery 12 includes an anode 14 comprising a thin film of lithium metal or an alloy thereof, the composite solid electrolyte film 10 and a cathode 16 which may be attached to a current collector 18 such as stainless steel. The battery may be enclosed in a hermetically sealed polymeric enclosure 20. Leads 22, 24 connect the anode 14 and cathode 16 to terminals 26, 28. The battery may suitably be provided in disc form with a terminal 26, 28 on the top and bottom faces, respectively.

The composite solid, polymeric electrolyte can be a non-conductive hydrocarbon polymer such as polyethylene or polypropylene or a conductive polymer, suitably a polyelectrolyte such as a polyalkylene oxide or a polyacrylonitrile. Polyethylene oxide polymers having a molecular weight from about 10$^4$ to about 10$^7$, suitably, about 10$^6$ can be used to form the CSE. Other polymers may optionally be present. From 0 to 30% by weight of polymers such as polypropylene, polyphosphazene, polysiloxane, polyurethane or polyethylene may be mixed with the polyethylene oxide in order to modify the physical and electrochemical performance of the solid polyelectrolyte. The solid polyelectrolyte contains, based on the oxygen content of the polyethylene oxide, from 1/1 to 100/1 of a lithium ion provided as a compatible salt such as a lithium halide. The lithium salt is deposited on small sized, inert, inorganic particles such as $Al_2O_3$. Usually the ratio of O/Li is from 1/1 to 10/1. The lithium salt is preferably lithium iodide.

The composite solid polyelectrolyte film nominally contains from 4–20 percent by weight of inorganic filler particles, preferably from 6–15% filler, from 15–40% by weight of a compatible lithium salt coated onto the particles and 0 to 10% by volume of plasticizer such as Triglyme.

A CSE was prepared by dissolving the lithium halide in a solvent such as acetonitrile and decanted. Alumina is added to the solution and the solution is stirred well. A further quantity of solvent was added followed by the slow addition of a binder resin. It was found that in the case of a polyelectrolyte such as PEO, the PEO immediately agglomerates the alumina into small balls covered with PEO. The PEO appears to act as a scavenger. The composition was not uniform.

In a modified procedure, isopropyl alcohol is added to the acetonitrile solution containing the lithium salt before the addition of PEO. This provides a uniform suspension of alumina coated with the lithium salt.

EXAMPLE FOLLOWS

Amounts of LiI, $Al_2O_3$ and PEO (M.W. $4 \times 10^6$) as shown in the following table were separately weighed.

| EXAMPLE | $Al_2O_3$, wt % | LiI, wt % | PEO, wt % | Triglyme, wt % |
|---------|-----------------|-----------|-----------|----------------|
| 1 | 10 | 35 | 55 | 0 |
| 2 | 6.4 | 23 | 63 | 7 |

LiI was dissolved in 50 ml of acetonitrile and the solution decanted. Alumina (both 0.05 micron and 0.30 micron) was added to the solution with stirring for 45 minutes. 80 ml of isopropyl alcohol (IPA) was added. The solution was again stirred well. 120 ml of acetonitrile was added to this suspension followed by another 80 ml of IPA. 1.6 grams of PEO (M.W. $4 \times 10^6$) was added slowly while the solution was being vigorously stirred. A uniform suspension of lithium iodide coated alumina particles was produced. The mixture was stirred overnight to dissolve the PEO. The suspension was then cast into films.

Thin films of CSE prepared by the modified procedure were subjected to a series of electrochemical measurements including a-c and d-c measurements. Both a symmetrical cell of the type Li/CSE/Li and an unsymmetrical cell of the type Li/CSE/SS (stainless steel) were used for the electrochemical characterization of the CSE films. With $TiS_2$ as the cathode a small capacity cell was fabricated and charge/discharge studies were made.

A further discovery of the invention is the influence of the size of the inorganic particle on the electrical performance of the electrolyte film. It has been found that electrical performance of the CSE is significantly higher when the filler particles are below 0.5 micron in size, preferably from 0.01 to 0.1 micron in size.

RESULTS AND DISCUSSION

Figure 1B:
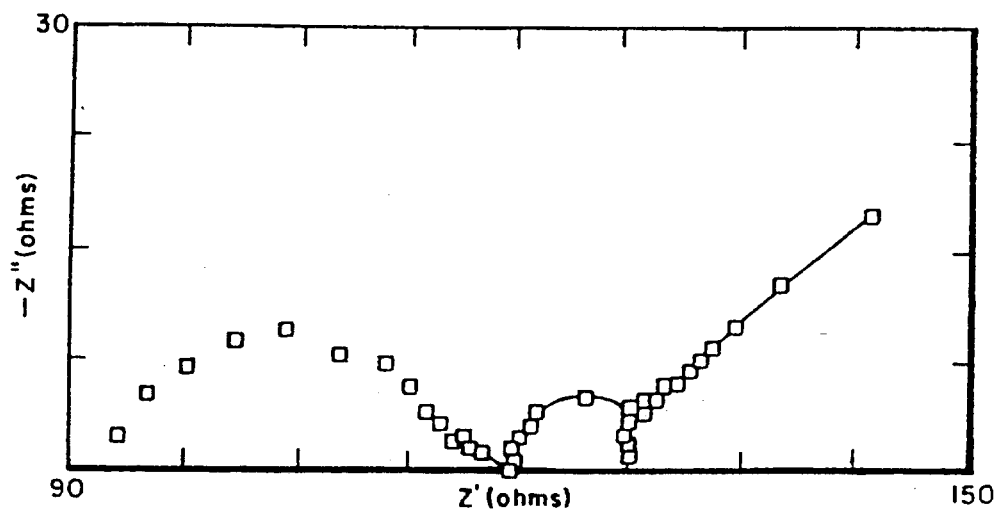
FIG. 1B is a NyQuist plot of a composite solid electrolyte of the invention containing 0.30 micron particles.
Figure 7:
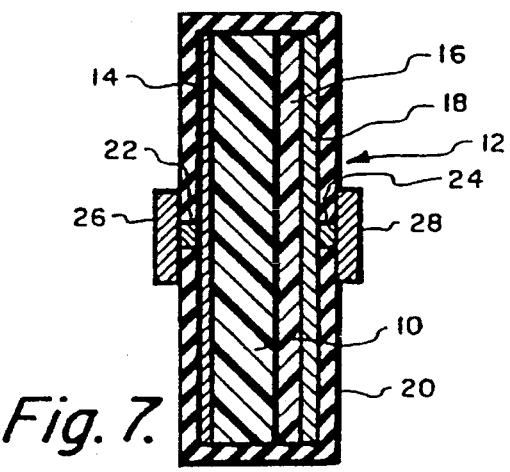
FIG. 7 is a schematic representation of a thin film battery incorporating the composite solid electrolyte of the invention.

A) BULK CONDUCTIVITY AND INTERFACIAL CHARGE TRANSFER RESISTANCE:

(Both the bulk conductivity ($1/R_b$) and the interfacial charge transfer resistance ($R_{ct}$) of the electrolyte (CSE) were determined from the a-c measurements. The a-c measurements were made in the frequency regime 100 KHz–5 Hz. A typical NyQuist plot is shown in FIGS. 1A and 1B for CSE films containing 0.05 and 0.3 micron alumina, respectively. While the high frequency intercept on the x-axis is the bulk resistance of the electrolyte the corresponding low frequency intercept gives the combination of the bulk resistance of the interfacial layer (present on the Li surface) and the charge transfer resistance, which was defined earlier as Rot. The CSE film containing 0.3 micron $Al_2O_3$ (FIG. 1B) exhibits three different regimes dominated by bulk processes at high frequencies followed by charge transfer processes at medium frequencies which in turn is followed by diffusional processes at low frequencies. However, the CSE films with 0.05 micron $Al_2O_3$ (FIG. 1A) exhibits almost resistor like behavior where the contribution from the charge transfer and diffusional processes are insignificant. The a-c characteristics of the CSE films with 0.3 micron $Al_2O_3$ is typical of systems where the transport number of the reversible ion is very low. The behavior of CSE films with 0.01 micron $Al_2O_3$ is similar to that of 0.05 micron $Al_2O_3$ film.

Figure 2:
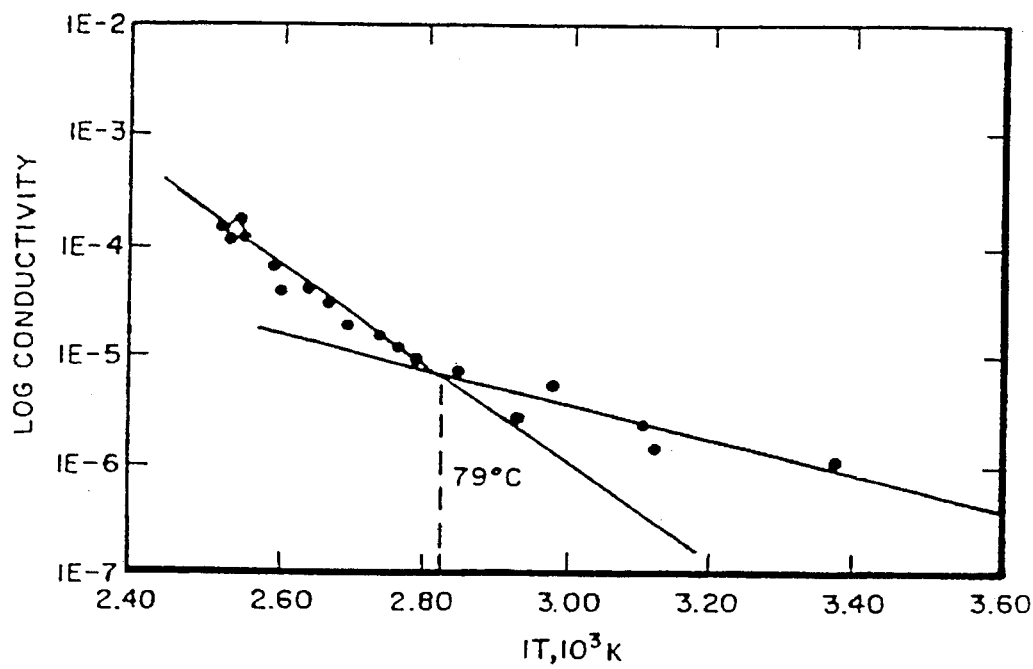
FIG. 2 is a plot of conductivity vs. 1/T of the composite solid electrolyte.

In FIG. 2 is a plot of the bulk conductivity of a CSE containing 0.05 micron of $Al_2O_3$ as a function of the reciprocal temperature. The data indicate that while the CSE exhibits a very modest conductivity below 79° C., above this temperature the conductivity picks up. Further the temperature (79° C.) at which the break occurs is higher than for PEO without the alumina. For PEO systems without alumina, the break in conductivity occurs around 60° C. The interfacial charge transfer resistance appears to be stable over a period of many days.

B) TRANSPORT NUMBER

The transport numbers of the cation and anion represent the ratio of the total current that will be carried by the cations and anions respectively. The cation transport number is close to unity. In Table 1, electrochemical data are compared with the data available in the literature for comparable systems. The data indicate that not only is the transport number higher but the $R_{ct}$ is lower for our system compared to state-of-the-art CSE systems.

TABLE 1

| Mat. Comp. | Temp °C. | Film bulk Cond. mho cm$^-$ | tLi$^+$ | Interface resistance ohm cm$^2$ |
|---|---|---|---|---|
| $(LiI)_1(PEO)_3$ | 116 | $6 \times 10^{-4}$ | $0.8 \pm 0.05$ | 2.5 |
| $(Al_2O_3)_{0.3}$ | 90 | $2 \times 10^{-4}$ | $0.9 \pm 0.05$ | 10 |
| $(LiI)_1(PEO)_{165}$ | 103 | $10^{-4}$ | $1 \pm 0.05$ | 25 |
| $(Al_2O_3)_{0.39}$ | | | | |
| PRIOR ART | | | | |
| $(PEO)_8$ NaI 10% $Al_2O_3$(3) | 120 | $3 \times 10^{-4}$ | | |
| $(PEO)_8$ LiClO 10% $Al_2O_3$(2) | 118 | $10^{-3}$ | 0.22 | 25 |
| $(PEO)_{4.5}$ LiSCN (6a) | 115 | $10^{-4}$ | 0.5 | 72 |

Figure 3:
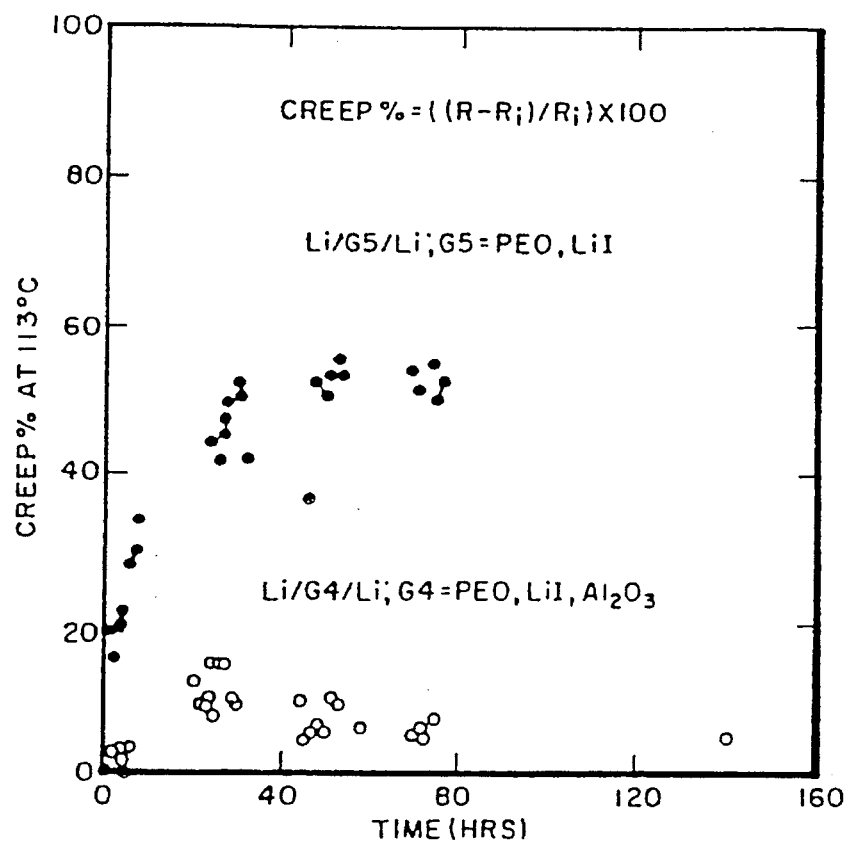
FIG. 3 is a plot Creep % vs. Time of PEO/LiI with and without Al$_2$O$_3$

In FIG. 3 a typical plot of creep % as a function of time is shown for two different polymer electrolytes, one containing alumina (CSE) and the other without. The results indicate that the CSE of the invention is much more dimensionally stable than the PEO/LiI electrolyte.

D) STUDIES ON Li/CSE/TiS$_2$ CELLS

Figure 4:
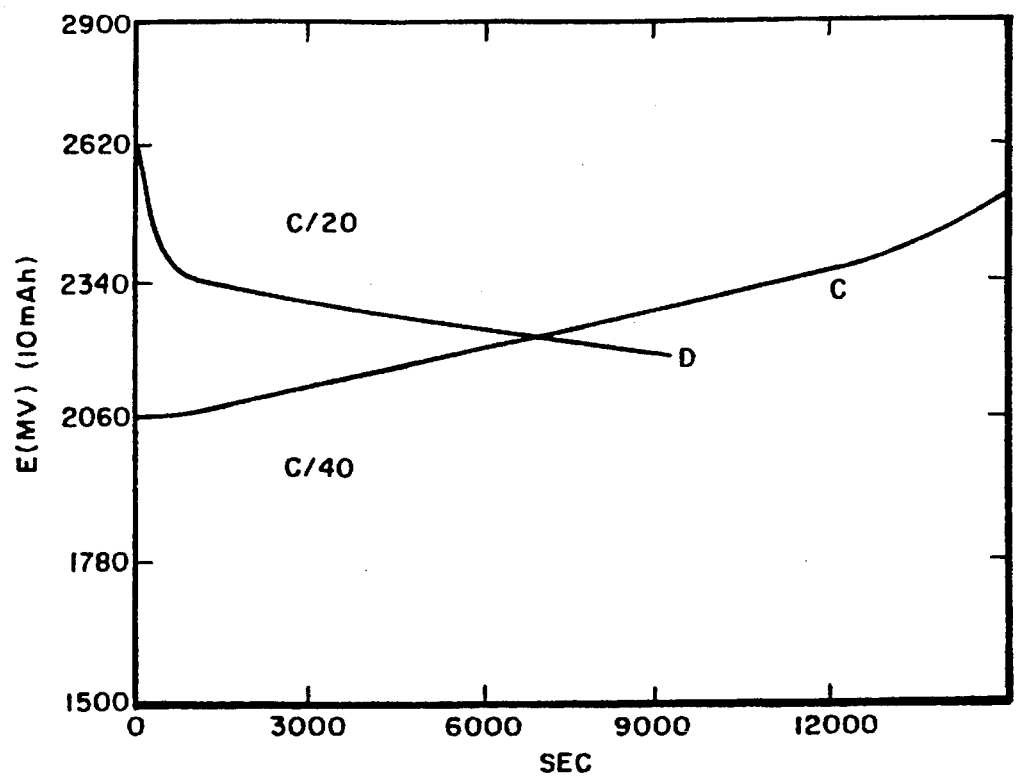
FIG. 4 are plots of D-C cyclic voltammetric characteristics of a Li/CSE/TiS$_2$ cell.
Figure 5A:
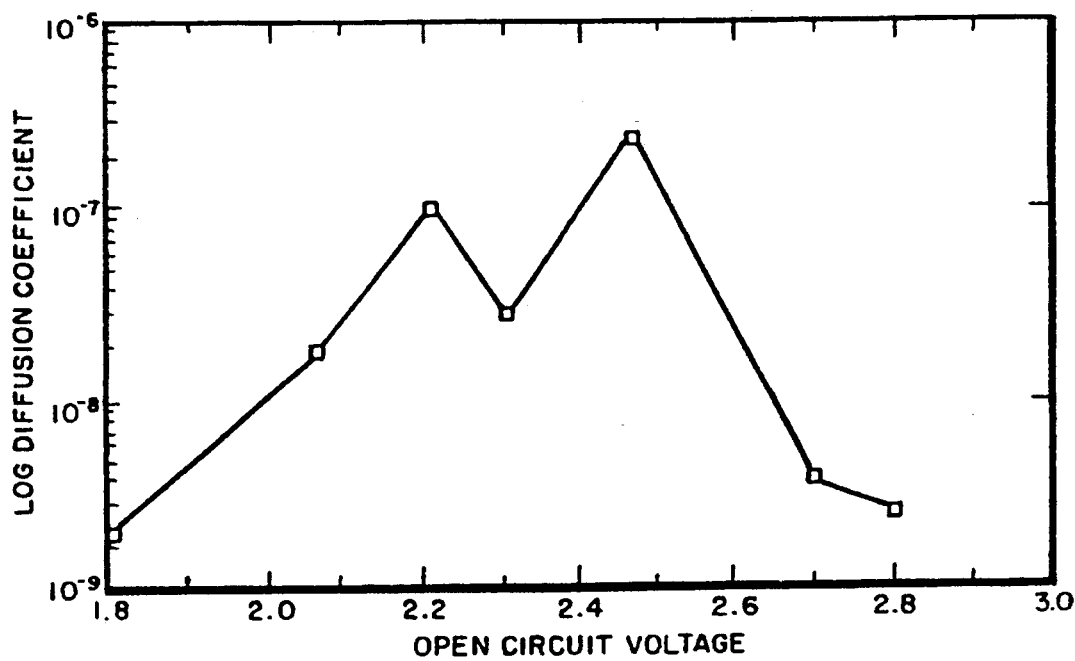
FIG. 5A is a plot of a Diffusion coefficient.
Figure 5B:
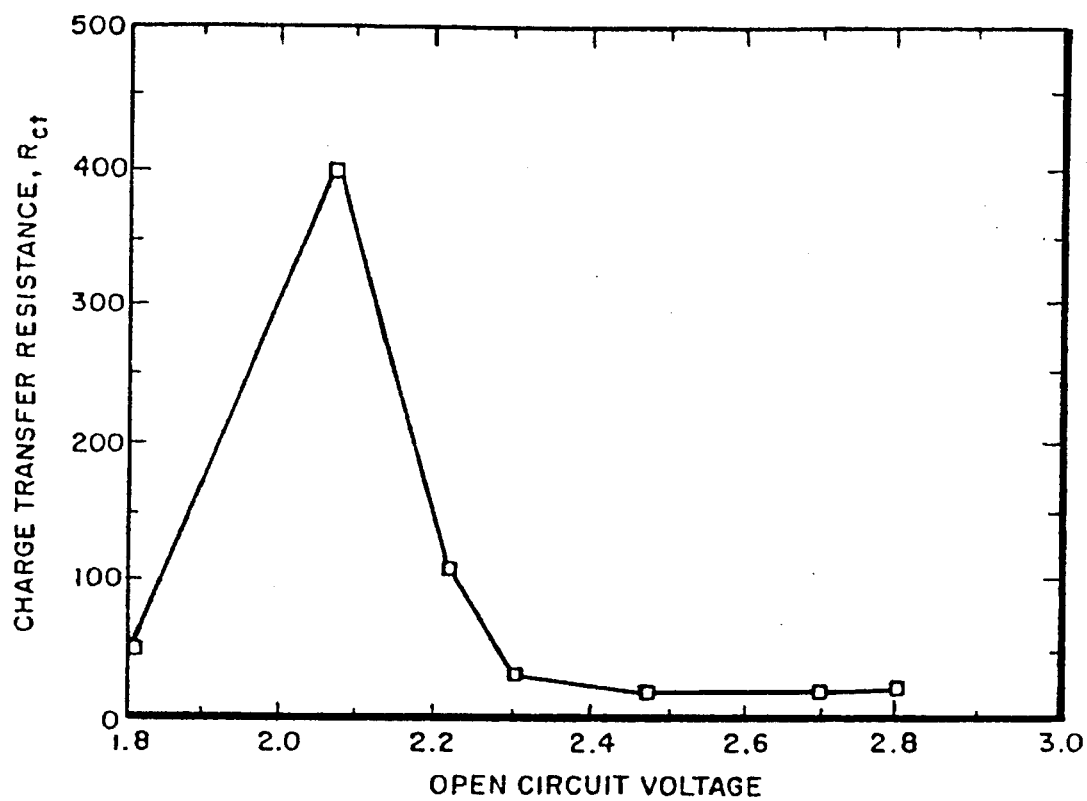
FIG. 5B is a plot of R$_{ct}$ vs. OCV.
Figure 6:
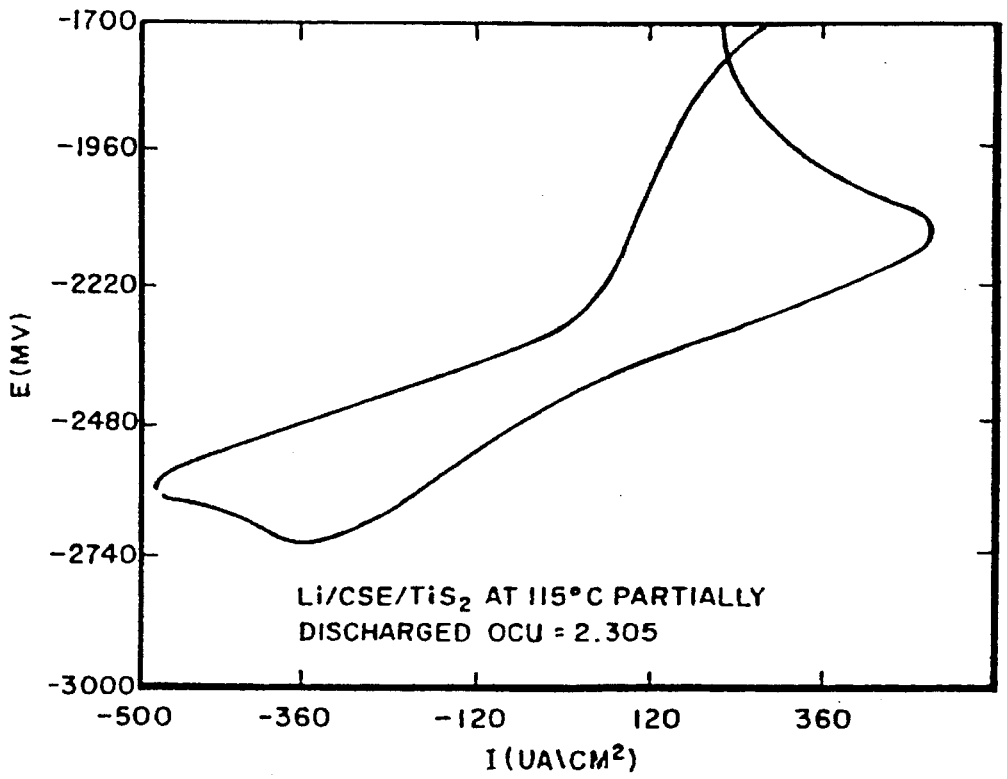
FIG. 6 is a plot showing charge/discharge characteristics of a Li/CSE/TiS$_2$ cell.

A 10 mAh small capacity cell was made with TiS$_2$ as a cathode and d-c cyclic voltammetric measurements were made as a function of open circuit voltages (OCVS). In FIG. 4 is shown a typical d-c cyclic plot and in the same figure is shown the peak splitting as a function of OCV. The well defined cathodic and anodic peaks indicate that Li$^+$ moves in and out of the TiS$_2$ cathode (the cell can be charged and discharged). The peak splitting increases with decrease in OCV of the cell which may be related to the increase in resistance of TiS$_2$ with lithiation. In FIG. 5A is shown the plot of diffusion coefficient of Li$^+$ in TiS$_2$ as a function of OCV and FIG. 5B shows charge transfer resistance at the TiS$_2$ electrode also as a function of OCV. While the R$_{ct}$ varies randomly with OCV the diffusion coefficient goes through a maximum at around 50% state-of-charge. A similar observation was made earlier for TiS$_2$ cathode with organic electrolytes. In FIG. 6 is shown the charge/discharge characteristics of the above cell. The cell was discharged at C/20 and charged at C/40 rates. Although the transport number for Li is close to unity the charge/discharge rates are very low. One explanation would be that the CSE bulk ionic conductivity is still very low by an order of magnitude than the required minimum of 10$^{-3}$ S cm$^{-1}$.

CONCLUSIONS

The method of the invention permits formation of uniform films of CSE with excellent mechanical properties. The composite solid electrolyte (CSE) prepared by the method of the invention exhibits the highest transport number reported yet for a polymeric electrolyte for Li$^+$. The conductivity of the CSE at 103° C. is 10$^{-4}$ mho cm$^{-1}$. Both the transport number and ionic conductivity are influenced by the particle size of alumina. Thermal creep measurement studies show that the CSE is much more dimensionally stable than the PEO/LiI electrolyte.

It is to be realized that only preferred embodiments of the invention have been described and that numerous substitutions, modifications and alterations are permissible without departing from the spirit and scope of the invention as defined in the following claims.

We claim:

1. A method of forming a film of a composite solid electrolyte comprising the steps of:

dissolving a lithium salt in a first solvent to form a solution, the first solvent being a cosolvent for the lithium salt and a binder polymer;

adding particles of a reinforcing filler to the solution to form a suspension;

adding a second solvent to the suspension, the second solvent being a solvent for the binder polymer and having low solubility for the lithium salt;

then adding the binder polymer to the suspension with stirring to dissolve the binder polymer in the suspension and form a uniform suspension of lithium salt coated particles of reinforcing filler in said solution of binder polymer; and casting the uniform suspension into a film.

2. A method according to claim 1 in which the binder polymer is a polyelectrolyte polymer.

3. A method according to claim 2 in which the polyelectrolyte comprises a polyalkylene oxide.

4. A method according to claim 2 in which the polyelectrolyte comprises a polyethylene oxide.

5. A method according to claim 3 in which the particles of filler are a refractory material.

6. A method according to claim 1 in which the particles comprise alumina.

7. A method according to claim 5 in which the lithium salt is a lithium halide.

8. A method according to claim 7 in which the lithium halide is a lithium iodide.

9. A method according to claim 7 in which the first solvent is an aprotic solvent.

10. A method according to claim 9 in which the second solvent comprises an alkanol containing 1 to 10 carbon atoms.

11. A method according to claim 10 in which the alkanol contains a branched chain.

12. A method according to claim 11 in which the alkanol is a secondary alkanol.

13. A method according to claim 12 in which the alkanol is isopropyl alcohol.

* * * * *

UNITED STATES PATENT AND TRADEMARK OFFICE
CERTIFICATE OF CORRECTION

PATENT NO. : 5,599,355
DATED : February 4, 1997
INVENTOR(S) : Ganesan Nagasubramanian; Alan I. Attia It is certified that error appears in the above-indentified patent and that said Letters Patent is hereby corrected as shown below:

On the title page, item

[73] Assignee: The United States of America as represented by the Administrator of the National Aeronautics and Space Administration, Washington, D.C.

On the title page, item [76] should read [75]

Signed and Sealed this

Twenty-ninth Day of July, 1997

Attest:

BRUCE LEHMAN

*Attesting Officer*     *Commissioner of Patents and Trademarks*